July 17, 1934.

L. J. TINT 1,966,531

PROJECTING MACHINE

Filed Sept. 2, 1931

Inventor:
Louis J. Tint,
By Henry Blech
Atty.

Patented July 17, 1934

1,966,531

UNITED STATES PATENT OFFICE 1,966,531

PROJECTING MACHINE

Louis J. Tint, Chicago, Ill.

Application September 2, 1931, Serial No. 560,754

5 Claims. (Cl. 88—24)

The invention relates to picture projecting machines, and more particularly to means for cooling such machines.

It is an object of the invention to provide means for effectively cooling the lamp housing so that the projection of a picture may be continued for a longer period of time than was hitherto possible.

A further object aims at providing means to cause fresh unheated air to be directed to a place where cooling is most effective.

A further object aims at providing means for guiding the air currents to contact with the condensing lenses so as to neutralize the heat effect of the lamp and prevent heat radiations to the picture carrier.

A still further object aims at providing means for guiding air currents to and in contact with the picture carrier to permit said carrier to be exposed to the heat effect of the lamp for a longer time.

Figure 1:
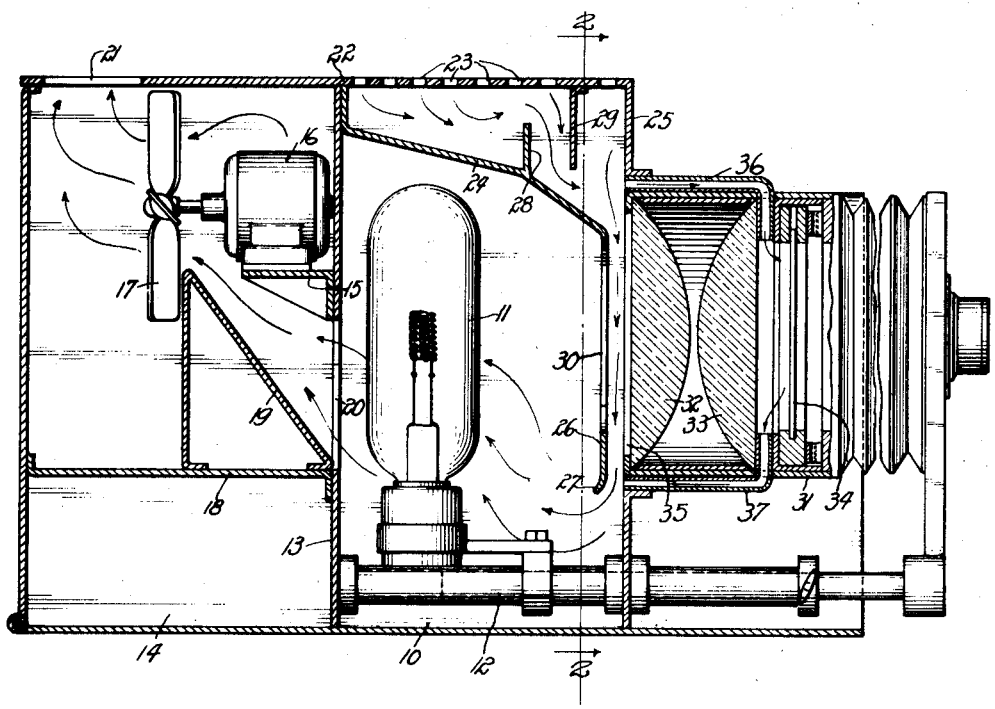

With these and other equally important objects in view which will become apparent from a perusal of the invention, the latter comprises a means described in the following specification particularly pointed out in the claims forming a part thereof, and illustrated in the accompanying drawing, in which Fig. 1 is an elevational section through a machine constructed in accordance with my invention.

Figure 2:
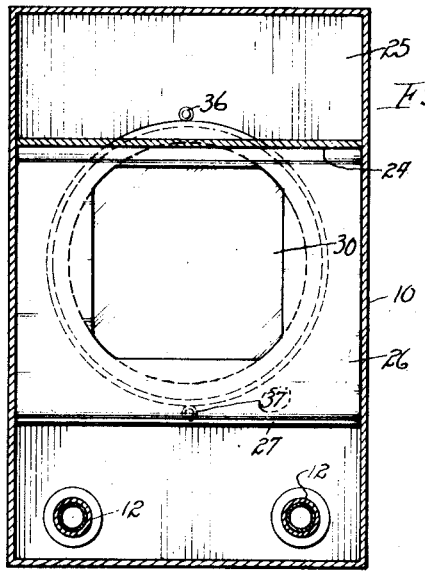

Fig. 2 is a section on the line 2—2 of Fig. 1.

Inasmuch as the invention is primarily concerned with air cooling means only such parts of the projecting machine will be described as are necessary for an understanding of the invention.

Referring to the drawing, 10 designates a lamp housing containing a lamp 11 carried by horizontal rods 12.

The housing 10 is extended past the rear wall 13 to form a casing 14. A bracket 15 is secured to the wall 13 to support a motor 16 driving a fan 17. A false bottom 18 in the casing 14 supports a baffle wall 19 which is inclined to direct air currents passing through an opening 20 provided in the wall 13. An opening 21 in the top wall of the casing 14 serves for the egress of heated air.

The top wall 22 of the lamp housing is provided with a number of perforations 23 to admit fresh air.

A partition 24 separates the lamp 11 from the top wall 22 and extends slantingly towards the front wall 25 of the housing 10 but stops short thereof to extend vertically and downwardly to form a partition 26 defining a vertical air passage.

The partition 26 extends downwardly slightly below the level of the false bottom 18 and terminates in rearwardly extending lip 27.

The partition 24 and the top wall 22 are provided with a baffle 28 and 29, respectively.

The partition 26 is formed with an opening 30 for the passage of light from the lamp 11. To the front wall 25 is secured a tube 31 containing the condensing lenses 32, 33 and spaced therefrom a plate 34. The front wall has an opening 35 to permit light rays to pass to the lenses.

A conduit 36 extends from the lamp housing on the tube and leads to the space between the lenses and the plate 34, and similarly a conduit 37 leads from said space along the bottom of the tube into the housing adjacent to the lower end 27 of the partition 26.

In use the motor, when energized, will cause rotation of the fan 17 setting up an air current flowing from the outside through holes 23 passing between wall 25 and the partition 26 past the lip 27 and the lamp through the opening 20 and escaping through the opening 21. Simultaneously air will flow through the conduit 36 through the space between the lenses and the plate 34 and continue through the conduit 37 into the lower part of the housing to join the main current.

Attention is called to the fact that cooling is effected by drawing fresh unheated air into contact with the lenses and the picture carrier and prior to being exposed to the heat effect so that a maximum degree of cooling is afforded.

While the drawing shows a preferred embodiment of the invention, numerous changes and alterations may be made without departing from the spirit of the invention.

I, therefore, do not wish to limit myself to the details of construction, as shown, but wish to include all changes, modifications, revisions, and alterations constituting departures within the scope of the invention as defined in the appended claims.

I claim:

1. In a projecting machine, a lamp housing having an inlet opening and containing a lamp, a tube secured thereto having condensing lenses and a picture carrier, means for screening said lamp from said tube, and means including a fan for causing fresh air to flow from said inlet opening between said screen and said tube prior to passing said lamp.

2. In a projecting machine, a lamp housing having an inlet opening and containing a lamp, a tube secured thereto having condensing lenses and a picture carrier, means for screening said lamp from said tube, and means including a fan for causing fresh air to flow from said inlet opening between said screen and said tube and between said lenses and said picture carrier prior to passing said lamp.

3. In a projecting machine, a lamp housing containing a lamp, a tube secured thereto having condensing lenses and a picture carrier, means for screening said lamp from said tube, means for causing fresh air to flow between said screen and said tube to contact with said lenses prior to flowing through said housing, and a bypass to divert fresh air to the space between said lenses and said picture carrier.

4. In a projecting machine, a lamp housing containing a lamp and having an air inlet opening, a tube secured to said housing and containing the condensing lenses and the picture carrier, a partition screening the lamp from said inlet opening and said lenses, and means including a fan for drawing air from said inlet opening and forcing it to pass both surfaces of said lenses prior to flowing through said housing past said lamp.

5. In a projecting machine, a lamp housing containing a lamp and having an air inlet opening, a tube secured to said housing and containing the condensing lenses and the picture carrier, a partition screening the lamp from said inlet opening and said lenses, and means including a fan remote from said inlet opening and drawing air therefrom to force it past one surface of said lenses and the adjacent surface of said picture carrier prior to flowing through said housing past said lamp.

LOUIS J. TINT.